United States Patent [19]
Marking et al.

[11] Patent Number: 5,938,974
[45] Date of Patent: Aug. 17, 1999

[54] YTTRIUM TANTALATE X-RAY PHOSPHORS WITH REDUCED PERSISTENCE

[75] Inventors: Gregory A. Marking; Vaddi Butchi Reddy, both of Sayre, Pa.

[73] Assignee: Osram Sylvania Inc., Danvers, Mass.

[21] Appl. No.: 09/150,916

[22] Filed: Sep. 10, 1998

[51] Int. Cl.$^6$ ............ C09K 11/67; C09K 11/68; C09K 11/69; C09K 11/82
[52] U.S. Cl. ...................................... 252/301.4 R
[58] Field of Search ...................... 252/301.4 R

[56] References Cited

U.S. PATENT DOCUMENTS

| | | | |
|---|---|---|---|
| 4,225,653 | 9/1980 | Brixner | 428/539 |
| 5,009,807 | 4/1991 | Reddy | 252/301.4 H |
| 5,112,524 | 5/1992 | Reddy et al. | 252/301.4 R |

*Primary Examiner*—C. Melissa Koslow
*Attorney, Agent, or Firm*—Robert F. Clark

[57] ABSTRACT

A composition and method are provided for reducing the persistence of yttrium tantalate x-ray phosphors having the monoclinic M' structure. Persistence is reduced by incorporating a molybdenum or vanadium additive into the phosphor. The method for incorporating the molybdenum or vanadium additive consists of adding a molybdenum or vanadium containing compound to the mixture of raw materials formulated to make the phosphor and firing the mixture at a temperature and for a time sufficient to form the phosphor.

20 Claims, No Drawings ically important to manufacture x-ray phosphors having the lowest possible persistence levels in order to obtain high quality radiographic images. Unfortunately, monoclinic M' yttrium tantalate phosphors commonly are afflicted with high persistence levels.

Thus, it would be an advantage to have monoclinic M' yttrium tantalate x-ray phosphors having reduced levels of persistence.

SUMMARY OF THE INVENTION

It is an object of the invention to obviate the disadvantages of the prior art.

It is another object of the invention to provide yttrium tantalate x-ray phosphors having reduced persistence.

It is further object of the invention to provide a method for reducing the persistence of yttrium tantalate x-ray phosphors.

In accordance with one aspect the invention, there is provided a monoclinic M' yttrium tantalate x-ray phosphor having an amount of molybdenum or vanadium to reduce persistence.

In accordance with another aspect of the invention, there is provided a monoclinic M' yttrium tantalate x-ray phosphor having a general formula $Y_{(1-y-(2/3)x)}Al_ySr_xTa_{1-z}Nb_zO_4$, where $0 \leq x \leq 0.20$, $0 \leq y \leq 0.10$, and $0 \leq z \leq 0.20$, and an amount of molybdenum or vanadium to reduce persistence.

In accordance with a further aspect of the invention, there is provided a method for reducing the persistence of monoclinic M' yttrium tantalate x-ray phosphors involving incorporating a molybdenum or vanadium additive into the phosphor. More, particularly, the molybdenum or vanadium additive is incorporated into the phosphor by making a mixture of raw materials formulated to make the phosphor, adding an amount of a molybdenum or vanadium containing compound to the mixture and firing the mixture at a temperature and for a time sufficient to form the phosphor.

DESCRIPTION OF THE PREFERRED EMBODIMENTS

For a better understanding of the present invention, together with other and further objects, advantages and capabilities thereof, reference is made to the following disclosure and appended claims.

We have discovered that the addition of molybdenum or vanadium to monoclinic M' yttrium tantalate x-ray phosphors substantially reduces the persistence of these phosphors. Preferably, the molybdenum or vanadium additive reduces persistence by at least about 10 percent and more preferably by at least about 25 percent. In general, the amount of molybdenum added to the total phosphor formulation should be at least about 0.001 wt. %, and the amount of vanadium should be at least about 0.002 wt. %, although lower amounts may also be effective. A preferred range for the amount of molybdenum added to the total phosphor formulation is from about 0.025 wt. % to about 1.0 wt. % and more preferably from about 0.05 wt. % to about 0.5 wt. %.

In general, the yttrium tantalate phosphors may be represented by the formula:

where $0 \leq x \leq 0.20$, $0 \leq y \leq 0.10$, and $0 \leq z \leq 0.20$. Unless otherwise indicated, the amounts of the molybdenum or vanadium additives and other activators described herein are formulated amounts. The actual amounts of these elements in the resulting phosphor may be less depending on the starting materials and process used to produce the phosphor. Given the description of the invention contained herein, it is anticipated that one skilled in the art using conventional techniques can readily determine the amounts of these compounds necessary to produce phosphors containing the desired additive/activator quantities. Amounts are given on a weight basis, either in weight percent (wt. %) or parts per million (ppm) unless otherwise indicated. Phosphor compositional formulas are given on a mole basis.

The additives are incorporated into the phosphor by first blending yttrium and tanatalum oxides together with strontium carbonate or another strontium source. A lithium sulfate flux is then added and blended with the oxide mixture. The molybdenum or vanadium containing compounds can be added to the oxide mixture, added with the lithium sulfate flux, or added after blending of the oxide and flux mixture and blended at that point. Preferred molybdenum compounds are molybdic acid and sodium molybdate. Other molybdenum containing compounds which do not volatilize immediately when heated to the phosphor firing temperature should also be useable as the source of the molybdenum additive, e.g., molybdenum containing alkali and alkaline earth metal salts, and other molybdates and molybdenum oxides. The preferred vanadium compound is ammonium vanadate. Other vanadium containing compounds which do not volatilize immediately when heated to the phosphor firing temperature should also be useable as the source of the vanadium additive, e.g., vanadium containing alkali and alkaline earth metal salts, and other vanadates and vanadium oxides. Aluminum and niobium may be added to increase x-ray optical fluorescence (XOF) brightness.

The molybdenum additive reduced the persistence of the yttrium tantalate phosphors with and without the additional presence of a $Sr^{2+}$ species. This is especially important because, although strontium will also decrease persistence and increase XOF brightness, the use of strontium in unactivated yttrium tantalate x-ray phosphors also enhances the phosphor's blue emission centered around 405 nm. This elevated blue emission is believed to have a negative impact on x-ray image resolution.

The following non-limiting examples are presented.

Monoclinic M' yttrium tantalate phosphors having the general formula $Y_{1-x}Sr_xTaO_4$ ($0 \leq x \leq 0.04$) were made using variable amounts of molybdenum and vanadium. The specific amounts of materials used in these examples are given in Tables 1 and 2. Persistence as measured herein was the ratio of the XOF brightness 30 seconds after x-ray excitation ceased to the XOF brightness during continuous x-ray excitation. Brightness and persistence measurements were made using an x-ray generator operating at 80 kV (Mo anode) in combination with a scanning spectrometer.

EXAMPLES 1–9

$Y_{1-x}Sr_xTaO_4$:Mo Phosphors

Molybdic acid, $(NH_4)_6Mo_7O_{24}\cdot 4H_2O$, was used as the molybdenum source in Examples 1–3. Sodium molybdate, $Na_2MoO_4\cdot 2H_2O$ was the molybdenum source in Examples 4–9. A control sample was prepared for each group of examples. Yttrium oxide, $Y_2O_3$, tantalum pentoxide, $Ta_2O5$, and strontium carbonate, $SrCO_3$, were weighed into 16 ounce glass bottles and intimately mixed by shaking the material on a paint shaker for 30 minutes. Molybdic acid, $(NH_4)_6Mo_7O_{24}\cdot 4H_2O$, or sodium molybdate, $Na_2MoO_4\cdot 2H_2O$, was pulverized (–140 mesh) and added to the blended oxide mixtures. $Li_2SO_4$, screened to –40 mesh, was then weighed and added to the oxide mixtures. After the mixtures were re-blended again on the paint shaker for 30 minutes, about 350 to 400 grams of 2 mm yttria stabilized zirconia beads were added and the mixtures were blended on a roll mixer for 60 minutes. The beads were separated from the mixtures and the mixtures were loaded into 250 ml prefired alumina crucibles. The crucibles were placed into an electric furnace at 800° C. and the temperature of the furnace was increased slowly to 1290° C. over a 6 hour time period. After firing the mixtures 1290° C. for 10 hours, the furnace was allowed to cool to 800° C. as fast as possible with the door closed and the crucibles were removed at 800° C. and allowed to cool to room temperature. The cooled, fired cakes were placed in 4 liter plastic beakers and soaked with deionized water. The phosphor samples were washed many times with deionized water until free of flux material. The phosphor was filtered, dried overnight at 120° C., sifted through a –325 mesh, and coated with 0.02 wt. % of colloidal silica (M-5 Cab-O-Sil manufactured by Cabot Corporation). Samples were submitted for x-ray optical fluorescence (XOF) brightness and persistence measurements. Brightness and persistence were measured relative to a standard yttrium tantalate phosphor. The presence of the monoclinic M' $YTaO_4$ phase was confirmed by x-ray diffraction. The optical properties of these phosphors are given in Table 3.

EXAMPLES 10–11

$YSr_{0.04}TaO_4$:Mo and $YSr_{0.04}TaO_4$:V Phosphors

Molybdic acid, $(NH_4)_6Mo_7O_{24}\cdot 4H_2O$, was used as the molybdenum source in Example 10. Ammonium vanadate, $NH_4VO_3$, was used as the vanadium source in Example 11. A control sample was prepared for this group of examples. The phosphors were prepared similarly to the phosphors in Examples 1–9 except that large amounts of the oxides, strontium carbonate, and flux were first blended and then smaller portions were used to prepare the examples. Small amounts of molybdic acid and ammonium vanadate were added to 200 gram quantities of the oxide and flux mixture and blended to form Examples 10 and 11. A 200 gram portion of this oxide and flux mixture was used as the control for these set of Examples. The specific relative amounts of each material are given in Table 2. Samples were submitted for x-ray optical fluorescence (XOF) brightness and persistence measurements. Brightness and persistence were measured relative to a standard yttrium tantalate phosphor. The presence of the monoclinic M' $YTaO_4$ phase was confirmed by x-ray diffraction. The measured optical properties are presented in Table 4.

TABLE 1

| Example No. | $Y_2O_3$ | $Ta_2O_5$ | $SrCO_3$ | $Li_2SO_4$ | $(NH_4)_6Mo_7O_{24}\cdot 4H_2O$ |
|---|---|---|---|---|---|
| control | 45.99 g | 90.00 g | 0.00 g | 38.08 g | 0.00 g |
| 1 | 45.99 g | 90.00 g | 0.00 g | 38.08 g | 0.278 g |
| 2 | 45.99 g | 90.00 g | 0.00 g | 38.08 g | 0.556 g |
| 3 | 45.99 g | 90.00 g | 0.00 g | 38.08 g | 1.111 g |

| Example No. | $Y_2O_3$ | $Ta_2O_5$ | $SrCO_3$ | $Li_2SO_4$ | $Na_2MoO_4\cdot 2H_2O$ |
|---|---|---|---|---|---|
| control | 45.99 g | 90.00 g | 0.00 g | 38.08 g | 0.00 g |
| 4 | 45.99 g | 90.00 g | 0.00 g | 38.08 g | 0.110 g |
| 5 | 45.99 g | 90.00 g | 0.00 g | 38.08 g | 0.220 g |
| 6 | 45.99 g | 90.00 g | 0.00 g | 38.08 g | 0.450 g |
| control | 45.07 g | 90.00 g | 1.20 g | 38.16 g | 0.00 g |
| 7 | 45.07 g | 90.00 g | 1.20 g | 38.16 g | 0.110 g |
| 8 | 45.07 g | 90.00 g | 1.20 g | 38.16 g | 0.220 g |
| 9 | 45.07 g | 90.00 g | 1.20 g | 38.16 g | 0.450 g |

TABLE 2

| Example No. | $Y_2O_3$ | $Ta_2O_5$ | $SrCO_3$ | $Li_2SO_4$ | $(NH_4)_6Mo_7O_{24}\cdot 4H_2O$ | $NH_4VO_3$ |
|---|---|---|---|---|---|---|
| control | 44.31 g | 86.71 g | 2.32 g | 66.67 g | 0.00 g | 0.00 g |
| 10 | 44.31 g | 86.71 g | 2.32 g | 66.67 g | 0.005 g | 0.00 g |
| 11 | 44.31 g | 86.71 g | 2.32 g | 66.67 g | 0.00 g | 0.01 g |

TABLE 3

| Example No. | Sr amount (x) | Mo wt. % | Rel. XOF Brightness | XOF Persistence (×10⁻⁴) |
|---|---|---|---|---|
| control | 0.0 | 0.0 | 91 | 84 |
| 1 | 0.0 | 0.025 | 82 | 15 |
| 2 | 0.0 | 0.05 | 72 | 3.9 |
| 3 | 0.0 | 0.10 | 62 | 0.5 |
| control | 0.0 | 0.00 | 93 | 98 |
| 4 | 0.0 | 0.025 | 83 | 63 |
| 5 | 0.0 | 0.05 | 82 | 38 |
| 6 | 0.0 | 0.10 | 79 | 14 |
| control | 0.02 | 0.00 | 124 | 1.30 |
| 7 | 0.02 | 0.025 | 112 | 1.10 |
| 8 | 0.02 | 0.05 | 117 | 0.90 |
| 9 | 0.02 | 0.10 | 119 | 0.66 |

TABLE 4

| Example No. | Sr amount (x) | Mo wt. % | V wt. % | Rel. XOF Brightness | XOF Persistence (×10⁻⁴) |
|---|---|---|---|---|---|
| control | 0.04 | 0.00 | 0.00 | 116 | 0.77 |
| 10 | 0.04 | 0.0014 | 0.00 | 109 | 0.54 |
| 11 | 0.04 | 0.00 | 0.0022 | 111 | 0.68 |

The data presented in Tables 3 and 4 demonstrate that the addition of molybdenum or vanadium to yttrium tantalate x-ray phosphors dramatically reduces their persistence. For examples 1–3, the reduction in persistence as compared to the control is at least about 82%. In general, the XOF brightness decreases with increasing molybdenum. Thus, in some instances, it will be desirable use a minimum amount of molybdenum in order to preserve acceptable brightness levels. The decrease in brightness is less problematic for phosphors containing strontium. One skilled in the art can empirically determine the necessary amount of the molybdenum or vanadium containing compound to be added to the mixture of raw materials formulated to make the phosphor in order to achieve the desired level of persistence in the phosphor.

While there has been shown and described what are at the present considered the preferred embodiments of the invention, it will be obvious to those skilled in the art that various changes and modifications may be made therein without departing from the scope of the invention as defined by the appended claims.

We claim:

1. A monoclinic M' yttrium tantalate x-ray phosphor having an amount of molybdenum or vanadium to reduce persistence.

2. The phosphor of claim 1 wherein the phosphor is formulated to contain at least about 0.001 wt. % molybdenum.

3. The phosphor of claim 1 wherein the phosphor is formulated to contain from about 0.025 wt. % to about 1.0 wt. % molybdenum.

4. The phosphor of claim 1 wherein the phosphor is formulated to contain from about 0.05 wt. % to about 0.5 wt. % molybdenum.

5. The phosphor of claim 1 wherein the phosphor is formulated to contain at least about 0.002 wt. % vanadium.

6. A monoclinic M' yttrium tantalate x-ray phosphor having a general formula $Y_{(1-y-(2/3)x)}Al_ySr_xTa_{1-z}Nb_zO_4$, where $0 \leq x \leq 0.20$, $0 \leq y \leq 0.10$, and $0 \leq z \leq 0.20$, and an amount of molybdenum or vanadium to reduce persistence.

7. The phosphor of claim 6 wherein the phosphor is formulated to contain at least about 0.001 wt. % molybdenum.

8. The phosphor of claim 6 wherein the phosphor is formulated to contain from about 0.025 wt. % to about 1.0 wt. % molybdenum.

9. The phosphor of claim 6 wherein the phosphor is formulated to contain from about 0.05 wt. % to about 0.5 wt. % molybdenum.

10. The phosphor of claim 6 wherein the phosphor is formulated to contain at least about 0.002 wt. % vanadium.

11. The phosphor of claim 6 wherein the phosphor has a general formula $Y_{1-x}Sr_xTaO_4$ where $0 \leq x \leq 0.04$.

12. The phosphor of claim 11 wherein the phosphor is formulated to contain at least about 0.001 wt. % molybdenum.

13. The phosphor of claim 11 wherein the phosphor is formulated to contain at least about 0.002 wt. % vanadium.

14. The phosphor of claim 11 wherein the phosphor is formulated to contain 0.001 wt. % to 0.10 wt. % molybdenum.

15. The phosphor of claim 1 wherein persistence is reduced by at least about 10%.

16. The phosphor of claim 1 wherein persistence is reduced by at least about 25%.

17. A method for reducing the persistence of monoclinic M' yttrium tantalate x-ray phosphors comprising incorporating a molybdenum or vanadium additive into the phosphor.

18. The method of claim 17 wherein the molybdenum or vanadium additive is incorporated into the phosphor by making a mixture of raw materials formulated to make the phosphor, adding an amount of a molybdenum or vanadium containing compound to the mixture and firing the mixture at a temperature and for a time sufficient to form the phosphor.

19. The method of claim 18 wherein the molybdenum containing compound is selected from molybdic acid or sodium molybdate and the vanadium containing compound is ammonium vanadate.

20. The method of claim 19 wherein the phosphor is fired at 1290° C. for 10 hours.

* * * * *